(12) United States Patent
Martinez et al.

(10) Patent No.: US 11,864,061 B2
(45) Date of Patent: *Jan. 2, 2024

(54) MONITORING ACTIVITY USING WI-FI MOTION DETECTION

(71) Applicant: AERIAL TECHNOLOGIES, INC., Montreal (CA)

(72) Inventors: Michel Allegue Martinez, Terrebonne (CA); Negar Ghourchian, Montreal (CA); David Grant, Santa Rosa Valley, CA (US); Francois Morel, Kirkland (CA)

(73) Assignee: Aerial Technologies Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,208

(22) Filed: Dec. 5, 2022

(65) Prior Publication Data

US 2023/0171564 A1 Jun. 1, 2023

Related U.S. Application Data

(63) Continuation of application No. 17/131,078, filed on Dec. 22, 2020, now Pat. No. 11,523,253, which is a
(Continued)

(51) Int. Cl.
*H04W 4/029* (2018.01)
*H04W 84/12* (2009.01)

(52) U.S. Cl.
CPC ............ *H04W 4/029* (2018.02); *H04W 84/12* (2013.01)

(58) Field of Classification Search
CPC ..................................................... H04W 4/029
(Continued)

(56) References Cited

U.S. PATENT DOCUMENTS

| 8,073,441 | B1 | 12/2011 | Unger et al. |
| 8,461,988 | B2 | 6/2013 | Tran |

(Continued)

FOREIGN PATENT DOCUMENTS

| CA | 3044480 | 5/2018 |
| CN | 105828289 | 8/2016 |

(Continued)

OTHER PUBLICATIONS

U.S. Appl. No. 16/798,319 Office Action dated Mar. 7, 2023.
(Continued)

*Primary Examiner* — Ted M Wang
(74) *Attorney, Agent, or Firm* — Rosenberg, Klein & Lee (57) ABSTRACT

Systems and methods for tracking activities of daily living (ADL) of a user are provided. The method monitors data from one or more internet of things (IoT) devices corresponding to one or more ADLs. The method further monitors data from an activity identification module. The data received is related to an ADL and includes one or more steps specific to the ADL. The data related to the ADL is stored in an activity logging database located in a memory and compared to an activity best practices (BP) database. A score that represents a compliance level is calculated based on the compared data. A response that corresponds the compliance level from a response database is executed.

20 Claims, 6 Drawing Sheets

Related U.S. Application Data continuation-in-part of application No. 17/014,720, filed on Sep. 8, 2020, now abandoned.

(60) Provisional application No. 62/897,205, filed on Sep. 6, 2019, provisional application No. 62/897,212, filed on Sep. 6, 2019, provisional application No. 62/897,236, filed on Sep. 6, 2019, provisional application No. 62/897,209, filed on Sep. 6, 2019, provisional application No. 62/897,219, filed on Sep. 6, 2019, provisional application No. 62/897,214, filed on Sep. 6, 2019, provisional application No. 62/897,195, filed on Sep. 6, 2019, provisional application No. 62/897,206, filed on Sep. 6, 2019, provisional application No. 62/897,208, filed on Sep. 6, 2019, provisional application No. 62/897,218, filed on Sep. 6, 2019, provisional application No. 62/897,191, filed on Sep. 6, 2019, provisional application No. 62/897,216, filed on Sep. 6, 2019, provisional application No. 62/897,201, filed on Sep. 6, 2019.

(58) Field of Classification Search
USPC ...................................................... 455/456.1
See application file for complete search history.

(56) References Cited

U.S. PATENT DOCUMENTS

| | | |
|---|---|---|
| 8,864,663 B1 | 10/2014 | Kahn |
| 9,219,790 B1 | 12/2015 | Filev et al. |
| 9,414,115 B1 | 8/2016 | Mao et al. |
| 9,703,892 B2 | 7/2017 | Ramer et al. |
| 9,854,292 B1 | 12/2017 | Matthews et al. |
| 9,867,548 B2 | 1/2018 | Le et al. |
| 9,985,846 B1 | 5/2018 | Roman et al. |
| 10,045,191 B2 | 8/2018 | Nguyen et al. |
| 10,374,646 B1 | 8/2019 | Fletcher |
| 10,419,880 B1 | 9/2019 | Long et al. |
| 10,818,384 B1 | 10/2020 | Peterson et al. |
| 10,999,705 B2 | 5/2021 | Martinez |
| 11,017,688 B1 | 5/2021 | Arazi |
| 11,039,278 B1 | 6/2021 | Carreiro et al. |
| 11,082,109 B2 | 8/2021 | Martinez |
| 11,218,769 B2 | 1/2022 | Martinez |
| 11,448,726 B2 | 9/2022 | Martinez |
| 11,523,253 B2 | 12/2022 | Martinez |
| 11,586,952 B2 | 2/2023 | Martinez |
| 11,593,837 B2 | 2/2023 | Martinez |
| 11,611,382 B2 | 3/2023 | Martinez |
| 2002/0188668 A1 | 12/2002 | Jeffery et al. |
| 2006/0224938 A1 | 10/2006 | Fikes et al. |
| 2007/0024580 A1 | 2/2007 | Sands et al. |
| 2007/0266395 A1 | 11/2007 | Lee et al. |
| 2008/0262909 A1 | 10/2008 | Li et al. |
| 2010/0242063 A1 | 9/2010 | Slaney et al. |
| 2011/0029277 A1 | 2/2011 | Chowdhary et al. |
| 2011/0117924 A1 | 5/2011 | Brunner et al. |
| 2011/0129047 A1 | 6/2011 | Mashino et al. |
| 2011/0258039 A1 | 10/2011 | Patwa et al. |
| 2012/0053472 A1 | 3/2012 | Tran |
| 2012/0135733 A1 | 5/2012 | Cormier et al. |
| 2012/0289147 A1 | 11/2012 | Raleigh et al. |
| 2012/0324494 A1 | 12/2012 | Burger et al. |
| 2013/0014136 A1 | 1/2013 | Bhatia et al. |
| 2013/0028443 A1 | 1/2013 | Pance et al. |
| 2013/0053990 A1 | 2/2013 | Ackland |
| 2013/0076528 A1 | 3/2013 | Boettner |
| 2013/0102256 A1 | 4/2013 | Cendrillon et al. |
| 2013/0115974 A1 | 5/2013 | Lee et al. |
| 2013/0326554 A1 | 12/2013 | Shkedi |
| 2014/0033240 A1 | 1/2014 | Card et al. |
| 2014/0181100 A1 | 6/2014 | Ramer et al. |
| 2014/0223467 A1 | 8/2014 | Hayton et al. |
| 2014/0278389 A1 | 9/2014 | Zurek et al. |
| 2014/0358012 A1 | 12/2014 | Richards et al. |
| 2015/0026708 A1 | 1/2015 | Ahmed et al. |
| 2015/0050923 A1 | 2/2015 | Tu et al. |
| 2015/0092747 A1 | 4/2015 | Ganesan |
| 2015/0110471 A1 | 4/2015 | Zheng |
| 2015/0113556 A1 | 4/2015 | Weast et al. |
| 2015/0121428 A1 | 4/2015 | Nguyen et al. |
| 2015/0365787 A1 | 12/2015 | Farrell |
| 2016/0057472 A1 | 2/2016 | Gupta et al. |
| 2016/0105700 A1 | 4/2016 | Collins et al. |
| 2016/0127766 A1 | 5/2016 | Luk et al. |
| 2016/0174185 A1 | 6/2016 | Ramakrishnan et al. |
| 2016/0253710 A1 | 9/2016 | Publicover et al. |
| 2016/0277529 A1 | 9/2016 | Chen et al. |
| 2016/0315682 A1 | 10/2016 | Liu et al. |
| 2016/0337701 A1 | 11/2016 | Khare et al. |
| 2016/0344779 A1 | 11/2016 | Jain et al. |
| 2017/0032191 A1 | 2/2017 | Ackland |
| 2017/0068790 A1 | 3/2017 | Fuerst |
| 2017/0116552 A1* | 4/2017 | Deodhar ............ G06Q 10/0639 |
| 2017/0135635 A1 | 5/2017 | Bostick et al. |
| 2017/0160089 A1 | 6/2017 | Jang et al. |
| 2017/0293729 A1 | 10/2017 | Movva |
| 2017/0315711 A1 | 11/2017 | Adams |
| 2017/0332192 A1 | 11/2017 | Edge |
| 2017/0354349 A1 | 12/2017 | Mohapatra et al. |
| 2017/0366955 A1 | 12/2017 | Edge |
| 2018/0008207 A1 | 1/2018 | Sarkela et al. |
| 2018/0035072 A1 | 2/2018 | Asarikuniyil et al. |
| 2018/0091952 A1 | 3/2018 | Sant et al. |
| 2018/0181094 A1 | 6/2018 | Funk et al. |
| 2018/0184165 A1 | 6/2018 | Maughan et al. |
| 2018/0330406 A1 | 11/2018 | Deluca et al. |
| 2018/0366228 A1 | 12/2018 | Buck |
| 2019/0007546 A1* | 1/2019 | Anderson ......... H04M 1/72454 |
| 2019/0051342 A1 | 2/2019 | Wootton et al. |
| 2019/0174170 A1 | 6/2019 | Chen |
| 2019/0178980 A1 | 6/2019 | Zhang et al. |
| 2019/0188756 A1 | 6/2019 | Bradley et al. |
| 2019/0246371 A1 | 8/2019 | Hwang et al. |
| 2019/0252079 A1 | 8/2019 | Constantin et al. |
| 2019/0306023 A1 | 10/2019 | Vasseur et al. |
| 2020/0036592 A1 | 1/2020 | Kholaif |
| 2020/0090022 A1 | 3/2020 | Ma et al. |
| 2020/0112939 A1 | 4/2020 | Scharf et al. |
| 2020/0120384 A1 | 4/2020 | Armaly |
| 2020/0133383 A1 | 4/2020 | Ahlstrom et al. |
| 2020/0186321 A1 | 6/2020 | Hwang et al. |
| 2020/0226388 A1 | 7/2020 | Ghessassi |
| 2020/0265700 A1 | 8/2020 | Bergman et al. |
| 2020/0292572 A1 | 9/2020 | Bateni |
| 2020/0302478 A1 | 9/2020 | Martinez |
| 2020/0303046 A1 | 9/2020 | Martinez |
| 2020/0327430 A1 | 10/2020 | Martinez |
| 2020/0383119 A1 | 12/2020 | Sun et al. |
| 2020/0397365 A1 | 12/2020 | Zhang et al. |
| 2021/0352441 A1 | 11/2021 | Liu |
| 2022/0060234 A1 | 2/2022 | Martinez |
| 2022/0070633 A1 | 3/2022 | Ghoshal |
| 2022/0167050 A1 | 5/2022 | Martinez |
| 2022/0256429 A1 | 8/2022 | Martinez |
| 2023/0003836 A1 | 1/2023 | Martinez |

FOREIGN PATENT DOCUMENTS

| | | |
|---|---|---|
| WO | WO 2016/187458 | 11/2016 |
| WO | WO 2018/094502 | 5/2018 |
| WO | WO 2020/170221 | 8/2020 |
| WO | WO 2020/240526 | 12/2020 |
| WO | WO 2021/084519 | 5/2021 |

OTHER PUBLICATIONS

U.S. Appl. No. 17/902,070 Office Action dated Mar. 31, 2023.

Deng et al., "CC-DTW: An Accurate Indoor Fingerprinting Localization Using Calibrated Channel State Information and Modified Dynamic Time Warping", Sensors 19, No. 9: 1984, Apr. 28, 2019

(56) References Cited

OTHER PUBLICATIONS (Apr. 28, 2019), [online] [retrieved on Aug. 20, 2020 (Aug. 20, 2020)], Retrieved from the internet: https://www.mdpif.com/1424-8220/19/9/1984.
Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Aug. 2, 2017), [online] [retrieved on Aug. 20, 2020 (Aug. 20, 2020)], Retrieved from the internet: https://aaai.org/ocs/index.php/IAAI/IAAI17/paer/view/15010.
Rui Zhou et al., "Device-free Localization Based on CSI Fingerprints and Deep Neural Networks", 15 Annual IEEE International Conference on Sensing, Communication, and Networking (SECON), Jun. 11, 2018 (Nov. 6, 2018), [online] [retrieved on Aug. 20, 2020 (Aug. 20, 2020] Retrieved from the internet: https://dl.acm.org/doi/10.1145/2639108.2639143.
Xi et al.; "Electronic Frog Eye: Counting Crowd Using WiFi", Department of Computer Science, Jul. 8, 2014.
Xu et al., "SCPL: Indoor Device-Free Multi-Subject Counting and Localization Using Radio Signal Strength", 2013.
Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.
Yang Wang et al., "E-eyes: Device-free Location-oriented Activity Identification Using Fine-grained Wifi Signatures", MobiCom'14, pp. 617-628 Sep. 7, 2014 (Jul. 9, 2014), [retrieved on Aug. 20, 2020 (Aug. 20, 2020)], Retrieved from the internet: https://dl.acm.org/doi/10.1145/2639108.2639143.
PCT Application No. PCT/IB2020/051503 International Preliminary Report on Patentability dated Aug. 10, 2021.
PCT Application No. PCT/IB2020/051503 International Search Report and Written Opinion dated Jul. 30, 2020.
PCT Application No. PCT/IB2020/055186 International Preliminary Report on Patentability dated Nov. 16, 2021.
PCT Application No. PCT/IB2020/055186 International Search Report and Written Opinion dated Oct. 15, 2020.
PCT Application No. PCT/IB2020/060271 International Preliminary Report on Patentability dated May 3, 2022.
PCT Application No. PCT/IB2020/060271 International Search Report and Written Opinion dated Feb. 15, 2021.
U.S. Appl. No. 16/796,662 Office Action dated Feb. 12, 2021.
U.S. Appl. No. 17/539,872 Office Action dated Jan. 5, 2023.
U.S. Appl. No. 16/795,198 Office Action dated Jan. 25, 2022.
U.S. Appl. No. 16/798,138 Office Action dated Sep. 8, 2020.
U.S. Appl. No. 16/794,668 Office Action dated May 24, 2022.
U.S. Appl. No. 16/798,319 Final Office Action dated Jun. 13, 2022.
U.S. Appl. No. 16/798,319 Office Action dated Dec. 29, 2021.
U.S. Appl. No. 16/798,148 Final Office Action dated Jan. 3, 2023.
U.S. Appl. No. 16/798,148 Office Action dated Jul. 26, 2022.
U.S. Appl. No. 16/798,148 Final Office Action dated Apr. 8, 2022.
U.S. Appl. No. 16/798,148 Office Action dated Oct. 22, 2021.
U.S. Appl. No. 17/131,078 Non- Final Office Action dated Mar. 2, 2022.
U.S. Appl. No. 17/006,579 Office Action dated Jan. 6, 2022.

* cited by examiner

MONITORING ACTIVITY USING WI-FI MOTION DETECTION

CROSS-REFERENCED TO RELATED APPLICATIONS

The present application is a continuation of U.S. patent application Ser. No. 17/131,078 filed on Dec. 22, 2020, which is a continuation-in-part of U.S. patent application Ser. No. 17/014,720 filed on Sep. 8, 2020, which claims the priority benefit of U.S. Provisional Patent Application No. 62/897,191 filed on Sep. 6, 2019, U.S. Provisional Patent Application No. 62/897,195 filed on Sep. 6, 2019, U.S. Provisional Patent Application No. 62/897,201 filed on Sep. 6, 2019, U.S. Provisional Patent Application No. 62/897,205 filed on Sep. 6, 2019, U.S. Provisional Patent Application No. 62/897,206 filed on Sep. 6, 2019, U.S. Provisional Patent Application No. 62/897,208 filed on Sep. 6, 2019, U.S. Provisional Patent Application No. 62/897,209 filed on Sep. 6, 2019, U.S. Provisional Patent Application No. 62/897,212 filed on Sep. 6, 2019, U.S. Provisional Patent Application No. 62/897,214 filed on Sep. 6, 2019, U.S. Provisional Patent Application No. 62/897,216 filed on Sep. 6, 2019, U.S. Provisional Patent Application No. 62/897,218 filed on Sep. 6, 2019, U.S. Provisional Patent Application No. 62/897,219 filed on Sep. 6, 2019, and U.S. Provisional Patent Application No. 62/897,236 filed on Sep. 6, 2019, the disclosures of which are incorporated by reference herein.

BACKGROUND OF THE INVENTION

1. Field of the Invention

The present disclosure is generally related to the use of a Wi-Fi motion detection system for monitoring the activities of a user; and more specifically, for monitoring the activities of a user to determine deviations from best practices.

2. Description of the Related Art

Activities of daily living (ADL) are thing people normally do in daily living including daily activities people perform for self-care such as, but not limited to, personal hygiene, continence management, dressing, feeding, ambulating or walking, etc. Understanding how each category affects a person's ability to care for themselves can indicate the difference between whether the person is independent or requires assistance. The ability or inability to perform ADLs can also be used as a practical measure of disabilities or other disorders.

Personal hygiene includes daily activities such as bathing, grooming, oral, nail and hair care. Continence management refers to a person's mental and physical ability to use the bathroom or toilet. Dressing is a person's ability to select and wear the proper clothes for different occasions, including changing clothes before bed and after waking up. Eating relates to whether a person has the ability both physical and mental to feed themselves or if they require assistance. Ambulating is the extent of a person's ability to change from one position to the other and walk independently. For example, this may relate to sitting, standing, laying down, climbing or descending stairs.

ADLs may include instrumental activities of daily living (IADLs), which are more complex daily activities such as companionship and mental support, transportation and shopping, preparing meals, managing a person's household, managing medications, communicating with others and managing finances. Companionship and mental support are a fundamental and much needed IADL. Companionship and mental support reflects on the help that may be needed to keep a person in a positive frame of mind. This may be a measure of both physical and mental state of a person. As information suggests depression may not seek companionship or avoid it.

Understanding ADLs and IADLs is a first step toward defining and securing appropriate care support. Across the medical and non-medical community, the concept of rating an individual's ability to perform activities of daily living independently is an important tool. Once a person's ADLs and IADLs have been assessed continuous communication and monitoring is necessary. Communications are needed to alert caregivers about when assistance is needed. Continuous monitoring is needed to understand how a person is continuing to complete ADLs and IADLs.

There is, therefore, a need in the art for improved systems and methods of using Wi-Fi motion detection system to monitor and analyze the activities of a user.

SUMMARY OF THE INVENTION

The present disclosure includes systems and methods for tracking and monitoring of one or more users and associated activities based on Wi-Fi motion detection. The systems and methods may determine whether a user activity meets predefined parameters or thresholds (e.g., indicating that the user needs assistance). Such detection and analysis may be applied to a variety of different activities, including activities associated with daily living or instrumental activities of daily living. Further, various embodiments of the present invention may include monitoring for positive and negative changes in routine and determining a cause of the changes. Such determination may include monitor the behavior of the user to determine whether the behaviors meet predefined best practices for the associated activities in which the user may or may not be engaging.

DETAILED DESCRIPTION

Embodiments of the present invention include systems and methods for tracking and monitoring of one or more users and associated activities based on Wi-Fi motion detection. The systems and methods may determine whether a user activity meets predefined parameters or thresholds (e.g., indicating that the user needs assistance). Such detection and analysis may be applied to a variety of different activities, including activities associated with daily living or instrumental activities of daily living. Further, various embodiments of the present invention may include monitoring for positive and negative changes in routine and determining a cause of the changes. Such determination may include monitor the behavior of the user to determine whether the behaviors meet predefined best practices for the associated activities in which the user may or may not be engaging.

Figure 1:
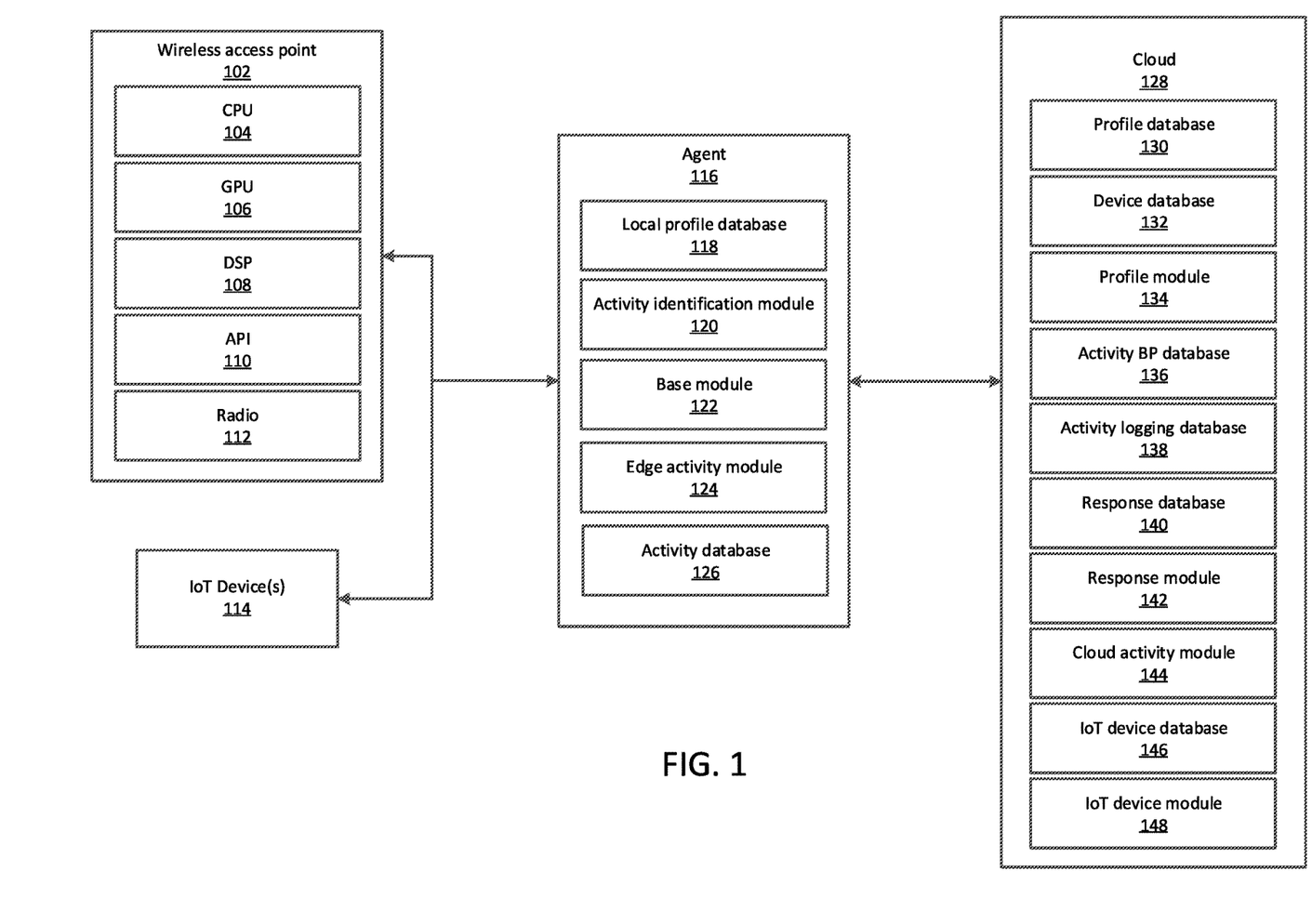
FIG. 1 illustrates an exemplary network environment in which a system for Wi-Fi-based motion detection may be implemented.

FIG. 1 illustrates an exemplary network environment in which a system for Wi-Fi-based motion detection may be implemented. The network environment may include wireless access point 102, agent device 116, IoT device 114, and cloud server 128, all of which may be configured to communicate with each other by way of one or more communication networks and systems known in the art. For example, the communication networks may be inclusive of wide area networks including the Internet, as well as local area networks.

The wireless access point 102 may be a Wi-Fi access point that is an IEEE 802.11n or 802.11ac or above access point. A wireless transceiver of the wireless access point 102 is in communication with a further stationary device over a corresponding further one of at least one radio frequency communication link. The wireless access point 102 is configured to record a further channel state, frequency response or impulse response information data set for the further one of the at least one radio frequency communication link at a corresponding time. In an embodiment, determining the activity of a user in the environment includes determining the activity of the user based on a comparison of the further channel state information (CSI), frequency response or impulse response of the channel data set to each of the at least one channel state information, or frequency or impulse response of the channel profiles of each of the plurality of activity profiles. In an embodiment, the activity is determined based on a sum of a similarity measurement of the channel state information, or impulse or frequency response of the channel data set and a similarity measurement of the further channel state information, or impulse or frequency response of the channel data set.

A central processing unit (CPU) 104 is the electronic circuitry within a computer that carries out the instructions of a computer program by performing the basic arithmetic, logic, controlling and input/output (I/O) operations specified by the instructions. A graphics processing unit (GPU) 106 is a specialized electronic circuit designed to rapidly manipulate and alter memory to accelerate the creation of images in a frame buffer intended for output to a display device. GPU 106 may manipulate computer graphics and image processing more efficiently than general-purpose CPUs for algorithms that process large blocks of data in parallel. A digital signal processor (DSP) 108 is a specialized microprocessor (or a SIP block), with its architecture optimized for the operational needs of digital signal processing. DSP 108 measures, filters and/or compresses continuous real-world analog signals. An application program interface (API) 110 is a set of routines, protocols, and tools for building software applications. The API 110 specifies how software components should interact. API 110 is used when programming graphical user interface (GUI) components. API 110 provides access to the channel state data to an agent 116. An access point compliant with either 802.11ac or 802.11n or above access point, allow a device to have multiple antennas. Multiple antennas from a radio 112 enable the equipment to focus on the far end device, reducing interference in other directions, and giving a stronger useful signal. This greatly increases range and network speed without exceeding the legal power limits.

One or more internet of things (IoT) devices 114 refers to the expanding network of physical objects that are connected to the internet (i.e. feature an IP address) and communicate and interact between objects. IoT device 114 can be any number of devices connected to the internet such as, but not limited to, virtual assistant devices, cameras, thermostats, appliances, door bells, cars, lights, and any number of electronics. In some examples, the user may register their IoT devices 114. The user may be asked one or more set-up questions via a user device that has a method of input (e.g. a tablet, mobile phone, etc.). For example, key demographics such as gender, age, weight, and/or height may provide data for more accurate tracking.

Examples of IoT devices 114 includes wearables, such as a fitness tracker or smart watch. Further examples of IoT devices 114 includes a smart device, such as a smart bed, smart chair, smart dresser, smart refrigerator, smart vacuum, smart speaker, smart phones, smart lighting fixtures, home assistants, smart TVs, smart toilet, connected toothbrushes, and/or smart lamp. A smart device may provide information regarding when a user takes an action or step that the Wi-Fi motion detection system may not be able to identify. For example, a smart speaker could listen to the user and how much the user interacts with another person or a plurality of people. In another example, a smart washer and/or dryer may monitor laundry activities and provide exact contextual data regarding of when the appliances were used. In another example, a smart dresser could provide information of when a user opens a drawer, which shows that the user is dressing or undressing. A wearable, such as a fitness tracker, could analyze arm movements from the accelerometer to understand the arm movements. For example, a smart watch could provide data that may improve the accuracy of movement related to a user transitioning.

The agent 116 is configured to collect data from the Wi-Fi chipset, filter the incoming data then feed and pass it to the cloud 128 for activity identification. In some examples, the agent 116 may be able to collect the data via one or more interface(s). The interface(s) may either accept inputs from users or provide outputs to the users, or may perform both actions. In some examples, a user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. In some examples, the interface(s) may either be implemented as a graphical user interface (GUI), a command line interface (CLI), a voice interface, or a web-based user-interface.

Depending on the configuration, the activity identification can be done on the edge, at the agent level, or in the cloud 128, or some combination of the two. A local profile database 118 is utilized when at least a portion of the activity identification is done on the edge. This could be a simple motion/no-motion determination profile, or a plurality of profiles for identifying activities, objects, individuals, biometrics, etc. In an example, the activity identification module 120 distinguishes between walking activities and in-place activities. In general, a walking activity causes significant pattern changes of the CSI, or impulse or frequency response of the channel amplitude over time, since it involves significant body movements and location changes. In contrast, an in-place activity (e.g. watching TV on a sofa) only involves relative smaller body movements that may be captured through small distortions of magnitude and/or of CSI.

A base module 122 continuously monitors the activity identification module 120 for specific steps or actions that relate to activities of daily living (ADLs) and instrumental activities of daily living (IADLs). For purposes of the present disclosure, ADLs, whenever mentioned, may encompass IADLs as well. ADLs may be activities that a user performs most days. Examples of ADLs encompassed by the present disclosure includes, but is not limited to, bathing or showering, changing clothes or dressing/undressing, companionship or having visitors, ascending or descending a staircase, aerobic exercise, eating habits within nutritional guidelines, grooming (e.g. hair combing, teeth brushing, shaving for males, depilating for women, applying make-up, etc.), oral hygiene, cleaning, continence (e.g. bladder or bowel movements), transitioning (e.g. sitting, standing, laying down, etc.), laundry, post-shopping activity, and the like. Examples of steps or actions that can be taken with respect to eating habits are entering kitchen, opening refrigerator, cooking food, etc. Examples of steps or actions that can be taken with respect to companionship are the user was visited by another person, the user interacted with another person thought video chat or phone conversations, etc.

Caregivers often use ADLs to assess a user's ability to live independently. Once base module 122 has determined that a step or action taken relates to an ADL, then the base module 122 compares the activities database 126 to the activity best practices (BP) database 136 on the cloud 128 to ensure it has the most recent ADL data, including waveform data for the different steps or actions. If the ADL data is not in the activities database 126, the ADL data is download and the edge activity module 124 is then initiated.

The edge activity module 124 is initiated when the base module 122 identifies an ADL and sends the ADL data to the edge activity module 124. The edge activity module 124 then monitors for additional ADL activity (e.g. steps, actions) that are listed in the activities database 126. When an ADL is identified it is then logged into the activity logging database 138. The edge activity module 124 may log the specific step or action required for the ADL, the time, the date, and the duration it took to perform the step or action required in the activity logging database 138. The activity database 126 contains just the data that is required for the edge activity module 124 to identify and log steps or actions required for the ADL. For example, the activity database 126 could list just the steps or actions that may be associated with the ADL and the related waveform data. The minimum amount of data required to allow for the edge activity module 124 to operate is loaded on to the activity database 126. As previously mentioned, during the base module 122 the activities database 126 can be updated from the activity BP database 136 as needed.

A cloud 128 analyzes and creates profiles describing various steps or actions required for the ADLs. A profile database 130 is utilized when at least a portion of the activity identification is done in the cloud 128. This could be a simple motion/no-motion determination profile, or a plurality of profiles for identifying activities, objects, individuals, biometrics, etc. A device database 132 stores the device ID of all connected wireless access points 102. A profile module 134 monitors the data set resulting from continuous monitoring of a target environment, to identify multiple similar instances of an activity without a matching profile in such a data set, combine that data with user feedback to label the resulting clusters to define new profiles that are then added to the profile database 130.

The activity BP database 136 contains the most recent data related to the best practices for various ADLs. The activity BP database 136 may contain, but is not limited to, list of steps or actions considered best practices for various ADLs, the time or duration it should take a user to perform a particular step or action required for the ADL. The activity BP database 136 may further store the most recent waveform data required for identifying each step or action. The activity BP database 136 may also store higher level best practices data for when and how often a user should be performing an ADL. For example, it may be best practices for a user to perform an ADL at least once every 48 hrs. It may be known that not performing a certain step or action for an extended period of time may result in a down turn in the user's hygiene or health. It may be known that not performing a certain step or action for extended period of time could be due to either mental or physical changes in the user. Thus, if the system determines that the user hasn't performed that ADL within that period of time, caregivers could be alerted of an issue.

The activity logging database 138 contains the logged data from the edge activity module 124. The data stored in the activity logging database 138 may be, but is not limited to, the identified step or action related to the ADL, the time and date, and the duration of the step or action. A response database 140 contains data for different levels of compliance and the response or alert required for each level of compliance. The response database 140 contains specific responses or alerts related to a compliance score or percentage based on how compliant the user was to best practices. A response or alert may be required regardless of compliance if certain steps or actions are skipped or not done in order or if no steps or actions are taken by the user. A response or alert maybe required if a step or action exceeds a certain duration. For example, if the overall time a user has spent doing a step or action exceeds a certain duration, it could be assumed that something might be wrong with the user and an alert or response may be required before waiting for any compliance score or waiting for the user to finish the step or action the user is doing. The response may consist of sending an alert, alerting authorities, contacting caregivers, sending information or alerts to an IoT or smart device. In some examples, in instances of non-compliance with oral hygiene best practices, the response may be sending scheduling prompts to the dentist office.

The cloud activity module 144 continuously monitors new data being added to the activity logging database 138 and compares it to the response database 140. During the ADL if a logged step or action taken by the user meets requirements laid out in the response database 140, then the response module 142 can be executed immediately. Otherwise, if during the ADL there were no compliance issues that required immediate action, the cloud activity module 144 monitors the activity logging database 138 until the ADL is complete. Once the ADL is completed, the cloud activity module 144 compares the new ADL data logged in the activity logging database 138 to the activity BP database 136 to determine how complaint the user was and develop a compliance score or percentage based on how compliant the user was to best practices. The compliance score or percentage is then sent to the response module 142 and the response module 142 is executed.

The response module 142 receives data related to the compliance score or percentage from the cloud activity module 144 and compares the received data to the response database 140 and extracts the proper response or alert required. The response module 142 then executes the response or alert. The response or alert may be, but is not limited to, reports to caregivers on compliance, alerts to alert caregivers, an emergency or other level of alerts, or the like.

The IoT device database 146 list all of the connected IoT devices 114 at the location or within the environment being monitored by the Wi-Fi motion detection system. The IoT device module 148 determines if there are any ADL related IoT devices 114 by searching the IoT device database 148. Data from ADL related IoT devices 114 is then monitored to further provide context and accuracy to the Wi-Fi motion detection system.

Figure 2:
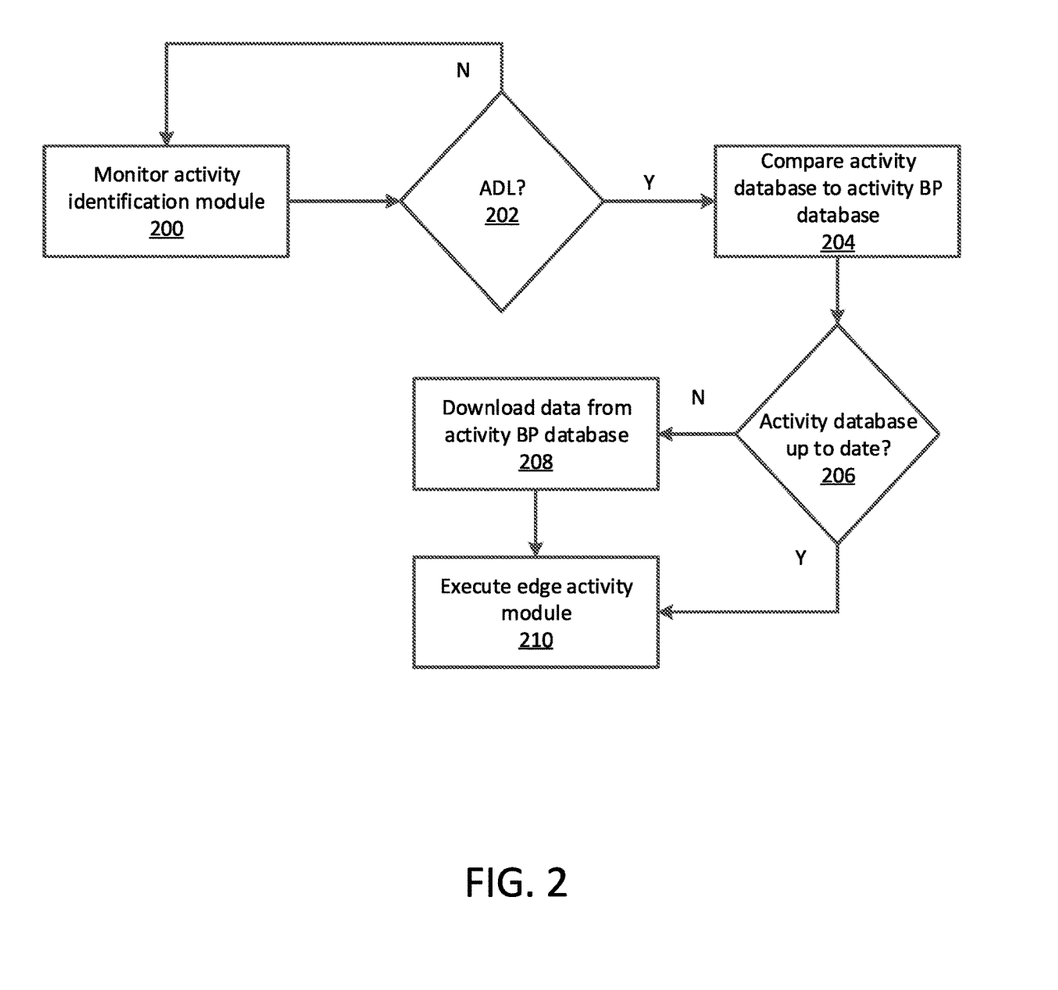
FIG. 2 is a flowchart illustrated an exemplary base module method for Wi-Fi-based motion detection.

FIG. 2 is a flowchart illustrated an exemplary base module method for Wi-Fi-based motion detection. For this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The process begins at step 200 with the base module 122 continuously monitoring the activity identification module 120 for ADLs or certain steps or actions. For example, the base module 122 may monitor for activities that a user may perform while cleaning (e.g., vacuuming, mopping, dusting, sweeping, cleaning bathrooms, cleaning windows, etc.). Certain steps or actions related to ADLs may suggest that the user is about to begin an ADL.

Similarly, the base module 122 may be monitoring for activities that may relate to clothing, dressing, or undressing. Based on such monitoring, the base module 122 may identify that the user is getting clothes from a dresser/closet or that the user has begun to take off a piece of clothing. Where the base module 122 may be monitoring for activities that relating to grooming (e.g., hair combing, teeth brushing, shaving for males, depilating for women, applying make-up, etc.), the base module 122 may identify the user is getting a brush from the bathroom sink or that the user is combing their hair. Where the base module 122 may be monitoring for activities that relating to oral care (e.g., brushing of teeth, flossing, etc.), the base module 122 may identify the user is using mouthwash or removing dentures.

In another example, where the base module 122 may be monitoring for activities that may be classified as exercise, the base module 122 may identify the user walking or riding a stationary bike. In another example, the base module 122 may identify the user is sitting on the toilet or their gait has been modified indicating they have had an incontinence episode. In another example, the base module 122 may identify the user ascending or descending the stairs. In another example, if the ADL is companionship, the action or step identified could be the identification of a second person entering the home of the user or the action of the user making a phone or video call and even further identifying that the user is talking or interacting. In another example, in the context of post-shopping activity, activities that the user may perform after shopping or running errands are identified (e.g. putting groceries away, opening boxes, placing items in their location, etc.). The base module 122 determines if the ADL has occurred, at step 202.

In other examples, base module 122 may rely on the IoT devices 114 rather than or in conjunction with the activity identification module 120. For example, the base module 122 may detect if any IoT device 114, such as a smart fridge, is functioning so that a post-shopping activity can be verified more quickly and efficiently. IoT devices 114 may be used to identify the ADL of cleaning by detecting a cleaning related device is running (e.g. smart vacuum). IoT devices 114 may be used to identify the ADL of doing laundry by detecting sensor data from a smart washer and dryer, such as, load size, soap concentration, etc.

If no ADL is identified at step 202, the base module 122 returns to step 200 and continues to monitor for an ADL. If an ADL is identified at step 202, the base module 122 compares, at step 204, the current data in the activity database 126 with the activity BP database 136 on the cloud 128 to determine if the activity database 126 is up to date, at step 206. This improves efficiency on the agent 116 by only storing the required data needed at the time and only downloading what is needed from the cloud 128. By doing this the amount of data stored on the agent 116 device is kept at a minimum. The activity database 126 includes the basic data the base module 122 and edge activity module 124 require to identify ADLs. For example, the database may contain the name or description of the step or action that related to the ADL, the best practices duration and time limit between the steps or actions, and the waveform data required for identifying each step or action.

If the activity database 126 is not up to date, the data needs to be downloaded. If the activity database 126 is up to date, the base module 122 sends the first identified ADL to the edge activity module 124 and skips to step 210 to execute the edge activity module 124. If the activity database 126 is not up to date when compared to the activity BP database 136, the required data to bring the activity database 126 up to date is downloaded from the activity BP database 136, at step 208. In some examples, the activity BP database 136 may provide the most recent waveform data required for identifying transition activities such as sitting, lying down or standing. Once the activity database 126 is known to be up to date the edge activity module 124 is executed, at step 210. At the same time the first ADL is also sent to the edge activity module 124.

In step 212, once the edge activity module 124 has been executed, to improve the potential identification of the next ADL activity, the base module 122 extracts from the activity BP database 136 the most likely step or action and time of the next step or action. For example, on average most people take one shower a day and per bathing best practices it is recommended that the user bathe or shower within 48 hours of their previous bath or shower. In some examples, the level or amount of activity the user does between bathing may require bathing more often. For example, a user who may have just exercised may require a bath or shower. The base module 122 may be looking for the user to possibly bathe or shower before or around the same time of the current activity. The base module 122 may continue to monitor for the next bathing activity until the best practice's threshold is reached. In another example, if the user had a bowel movement in the restroom, wiped, and flushed the toilet, then there may be two potential next toileting activities, the first being that the user needs to wash their hands. In another example, if the user combed their hair, brushed their teeth, shaved in case of a male or applied make-up in case of a female, then there may be two potential next grooming activities, the first being that the user may need to brush their teeth after lunch, and the second being that the user may need to reapply makeup in case of a female or comb their hair once again before leaving the house. The base module 122 could reduce the work load on the agent 114 by only downloading the next most likely steps or actions to occur, and only downloading other toileting data when needed. The system then continues to monitor for all toileting activities but particularly the next most likely activity identified at step 214.

The module then continues to monitor at step 214 for the next ADL. If no ADL has been identified the base module 122 checks to see when the last ADL occurred. This can be done by looking at the activity logging database 138 on the cloud 128. By identifying the time the last ADL occurred, at step 216, the base module 122 calculates how long it has been since the ADL based on the ADL logging database 138 data and last entry. For example, as previously discussed the best practices for bathing or shower may suggest that the maximum limit between bathing or showering may be 48 hours. If it is determined that the user hasn't bathed or showered in over 48 hours, at step 218, the base module 122 determines that the user is out of compliance with best practices. In an example, there may also be a minimum limit on how often the user should be taking shower. For example, normally a person mayn't take a shower more than once within an hour. If the user is taking multiple showers or baths too frequently it could suggest a either mental or physical issue. Once it has been determined that the user is out of compliance with best practices the compliance data is sent at step 220 to the response module 142. The response module 142 is then executed at step 222.

Figure 3:
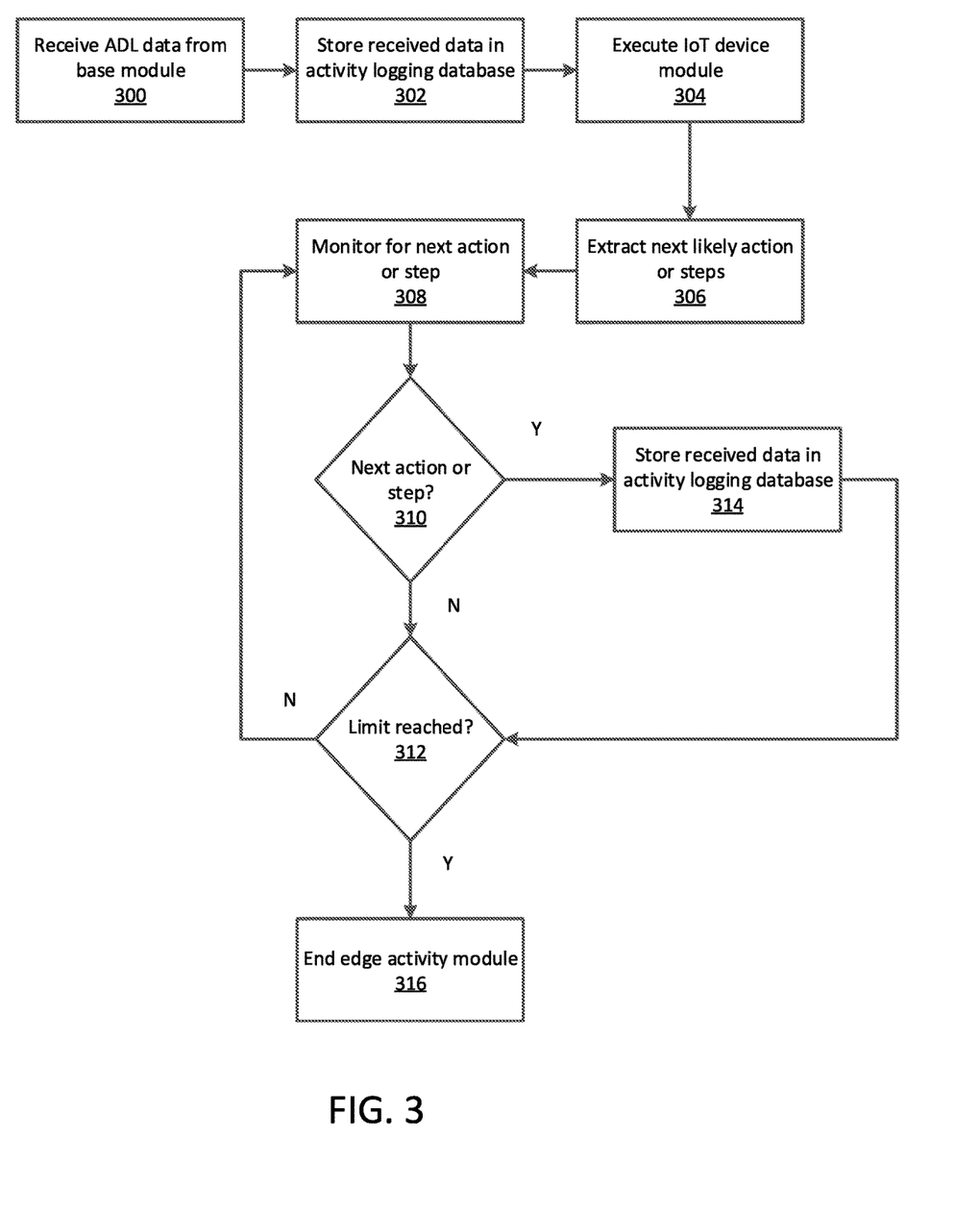
FIG. 3 is a flowchart illustrated an exemplary edge activity module method for Wi-Fi-based motion detection.

FIG. 3 is a flowchart illustrated an exemplary edge activity module method for Wi-Fi-based motion detection.

The process begins at step 300 when the edge activity module 124 receives from the base module 122 the first ADL data (i.e. step or action) it initially detected. In an example, the base module 122 may identify the user turning on the shower in preparation to take a shower. Once the first ADL data is received from the base module 122 the first ADL data is stored, at step 302, in the activity logging database 138. The data that is stored may consist of the name of the step or action (e.g. turning on the shower), the time, the date and in some cases the duration, if applicable. In some examples, a timer is started to determine the duration of the step or action (e.g. aerobic exercise activity). The next identified step or action is compared to the previous step or action. When the next identified step or action is not the same as the previous step or action, the timer is ended, as the user has completed the task. The duration of the step or action may be logged into the activity logging database 138.

The IoT device module 146 is executed at step 304 to monitor any data from related IoT devices 114 (e.g. smart device, wearable, etc.). This data may add accuracy to the Wi-Fi motion detection system as well as provide context to activities that the Wi-Fi motion detection system can't see (e.g. temperature of the water in shower). In an example, accelerometer data from a wearable could provide accurate timing and speed of the user standing up or sitting down to determine the ADL of transition activity. If related IoT devices 114 are available, they can provide additional context to confirm activities and provide additional data which can't be picked up by the Wi-Fi motion detection system. Once that ADL data is logged, the edge activity module 124 then extracts, at step 306, from the activity database 126 the most likely next steps or actions to occur as it relates to the flow or sequence of events when doing the ADL. For example, in the example of bathing or showering, once the user has turned on the water, the user may let it run for a few minutes to let it warm up, in the meantime, the user may start to undress. The edge activity module 124 then begins to monitor, at step 308, the activity identification module 120 for the next step of action.

For example, certain steps or actions may need to be completed when preparing for the ADL, showering, and if one of these steps or actions is skipped it could result in injury or other issues. For example, once turning on the water, the most likely next step or action may be undressing in preparation to enter the shower. If not, it may be due to a mental illness that the user may have forgotten to remove their clothing. Further, the user may get burned if they didn't test the temperature of the water first.

The data from any IoT devices 114 identified in step 304 is also monitored and used to confirm if an activity has occurred, if relevant IoT data is available. For example, while preparing to enter the shower a patient may test the water temperature before entering. If for some reason the patient doesn't test the water or tests it but doesn't adjust the temperature to a safe temperature the data from the IoT devices 114 (e.g. smart showerhead) can provide additional context. In this example it may let the Wi-Fi motion detection system that the water is too hot. If ADL best practice steps are not followed the IoT devices 114 can be used to help prevent or provide alerts. In this example, the smart showerhead could turn off the water to prevent burns.

At step 310, the module then checks to see if the next likely step has occurred. If for some reason the next likely step or action is not identified or has not occurred the edge activity module 124 may then check if a certain limit (e.g. time or amount of non-ADL activity) is reached, at step 312. The purpose of this step is to determine if the activity of bathing has been completed or if for some reason the user stopped bathing in the middle of the activity for some reason. In an example, if the user first turns on the shower and undresses but doesn't get in after a period of time (e.g. 20 minutes), it could be assumed something is wrong, either the person has forgotten to get in the shower or there is a physical issue. In an example, if the next activity is not related to companionship, then the system checks to see if the time passed is longer than a predefined period of time (e.g. 10 minutes) since the last identified companionship step or action. If it has been more than that period of time, it is assumed that if there has been no companionship activity in the last 10 minutes, then the visit or interaction has come to an end. In another example, if the identified activity is determined to not be a grooming activity, continence or toileting activity, or other ADLs mentioned above, the system may increment a counter to determine if the activity has been completed. If the counter exceeds a threshold, it can be assumed the activity is complete. If the limit is reached, the edge activity module 124 ends, at step 316.

If the next likely step or action is identified or has occurred, at step 310, the edge activity module 124 logs or stores the time, date, duration and the step or action in the activity logging database 138, at step 314. Once completed, the edge activity module 124 checks if the certain predefined limit (e.g. time or amount of non-ADL activity) is reached, at step 312. If the limit has not been met, the edge activity module 124 goes to step 308 and continues to monitor for the next step or action. If the pre-defined limit has been met, the edge activity module 124 goes to step 316 and ends as it is assumed that the user is no longer performing the ADL activities after a predetermined period of time and there is no need to continue to monitor. If no activity has been monitored for a certain period of time the edge activity module 124 may end, at step 316, allowing the base module 122 to continue to monitor.

Figure 4:
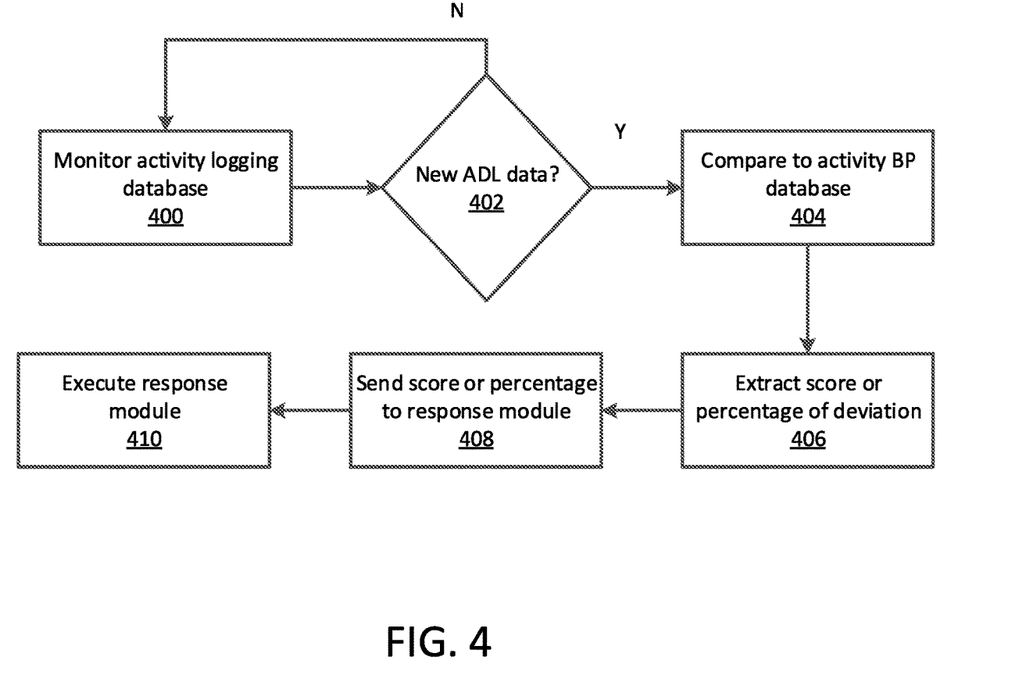
FIG. 4 is a flowchart illustrated an exemplary cloud activity module method for Wi-Fi-based motion detection.

FIG. 4 is a flowchart illustrated an exemplary cloud activity module method for Wi-Fi-based motion detection.

The process begins at step 400 with the cloud activity module 144 continuously monitoring the activity logging database 138 for any new ADL data. The cloud activity module 142 checks to see if any new ADL data (i.e. a step or action related to the ADL) has been stored in the activity logging database 138, at step 402. If no new ADL data is identified the cloud activity module 142 continues to monitor the activity logging database 138 until there is new ADL data. If new ADL data is found in the activity logging database 138, the new ADL data from the activity logging database 138 is compared to the activity BP database 136, at step 404. For example, in the context of the ADL of transitioning, if the user sitting or lying down, the system monitors how long the user remains sitting or lying. It continuously compares the duration of the user sitting or lying down to the activity BP database 136. In another example, in the context of eating habits, nutritional data such as, total calories for a meal, are used to determine if the user has exceeded recommended or fallen short of recommended nutrients. The total nutritional intake for a day for the user may be compared to the activity BP database 136, which stores the recommended nutritional intake values for the user. The data is compared to identify where there are deviations from the best practices stored in the activity BP database 136.

The activity BP database 136 stores the name or descriptions of the common steps or actions for the respective ADL, the waveform data, the most likely next steps or actions, the duration and potential time limits. For example, the activity BP database 136 may store a recommended timeframe for cleaning the kitchen. The activity BP database 136 may also contain higher level best practice information such as recommended frequency and the recommend limit on how often a person should, for example, bathe, change clothes, engage in grooming, toileting, cleaning, or oral care activities. In another example, the activity BP database 136 may store the recommended nutritional intake values for the user with respect to the ADL of the user's eating habits. In another example, data such as how often the user should be doing laundry to ensure healthy hygiene, how long laundry can sit wet in a washer before having to be washed again due to mold and mildew, recommended load size, and if and how much soap should be used based on the size of load may be stored in the activity BP database 136. In another example, the activity BP database 136 may store recommend duration of time for how long the user should be been sitting or lying down.

In another example, the activity BP database 136 stores data for the average times for people of different demographic groups to climb staircases. This is done based on the demographics of the user, such as age, gender, medical conditions, and the like, and the configuration of the environment (e.g. the number of steps in a staircase). For example, the system may search for the average time it may take an 85-year-old woman to climb a twelve step staircase or a 25 year old man climbing an eight step staircase.

In another example, the activity BP database 136 may store how often the user should have meaningful interaction with another person (e.g. in-person interaction, any interaction), how long they have the interaction, and how involved in that interaction the user is. Changes in the user's interaction level with other people are also stored (e.g. 50% reduction from average of phone or video calls, 40% reduction from average of in-person visits per week).

In an embodiment, the cloud activity module 144 may also determine if an ADL deviated because of a unique circumstance (e.g. time limit expiring, counter, time of day). For example, in the context of eating habits, if the user is under the expected nutritional range at noon it doesn't mean they are out of compliance as they still have at least one more meal to go. If it is at the end of the day or the last meal of the day the values are checked to make sure they do not fall short of nutritional ranges, then the user could become malnourished. The cloud activity module 144 may identify if there are any special responses or actions required due to the time limit expiration. In another example, the cloud activity module 144 may check to ensure there hasn't been a maximum timeframe that has been exceeded for the user to engage in post-shopping activities. If the cloud activity module 144 may hasn't detected a new step or action logged (e.g. more than a week passes without shopping for weekly perishables, such as milk or eggs), it may be assumed that the user may not have performed any post-shopping activities in that period of time. If the frequency timeframe recommended in the best practices database passes, then the response module 142 may be executed.

At step 406, a compliance score or percentage is may be calculated by using the comparison data. The score may be a numerical score or even a percentage representing the user's percent compliance to best practices for bathing. In one embodiment the cloud activity module 144 might calculate a percentage complaint by comparing the identified steps with the best practices step and identifying what steps were missed. In some examples, the person may not have completed an entire bathing activity for some reason. In some examples, where a time limit expires, the cloud activity module 144 may score it according to the activity BP database 136. In some examples, ADL data is used to calculated how long the user has been sitting or lying down, by using the time of the transition activity (e.g. sitting or lying down) stored in the activity logging database 138 and calculating how much time has lapsed since the user sat down or laid down.

In another example, if the ADL activity is doing laundry and the current step or action is the washing machine running, the time since the last activity is calculated time is then compared to the activity BP database 136. The activity BP database 136 may suggest that any time under 24 hours doesn't get an alert, while any calculated time greater than 24 hours may have an alert sent to a caregiver. If there is no new activity, the time since the last activity may continued to be calculated. If there is a new activity, the cloud activity module 142 determines if that step or action is, for example, unloading the washer. Looking for the activity of unloading the washer may signal that the clothes were removed from the washer and most likely put in the dryer or hung to dry and won't get mildew. If the calculated time is greater than the alert time set forth in the activity BP database 136, then an alert is sent to the caregiver.

In another example, it may be determined if any of the retrieved aerobic activities qualifies as moderate or vigorous. Vigorous may be defined as an aerobic exercise activity whose intensity level is greater than one standard deviation above the user's average intensity level. Moderate may be defined as an aerobic exercise activity whose intensity level is greater than the user's average intensity level but below one standard deviation above their average. The score or percentage may be calculated based upon how close to reaching a best practice goal, which is stored in the activity BP database 136. For example, the activity BP database 136 may indicate that the best practice goal may be 300 minutes of moderate aerobic exercise, or 150 minutes of vigorous aerobic exercise, over the course of a five day period. The calculated score or percentage is then sent to the response module 142 at step 408. The response module 142 is then executed at step 410.

Figure 5:
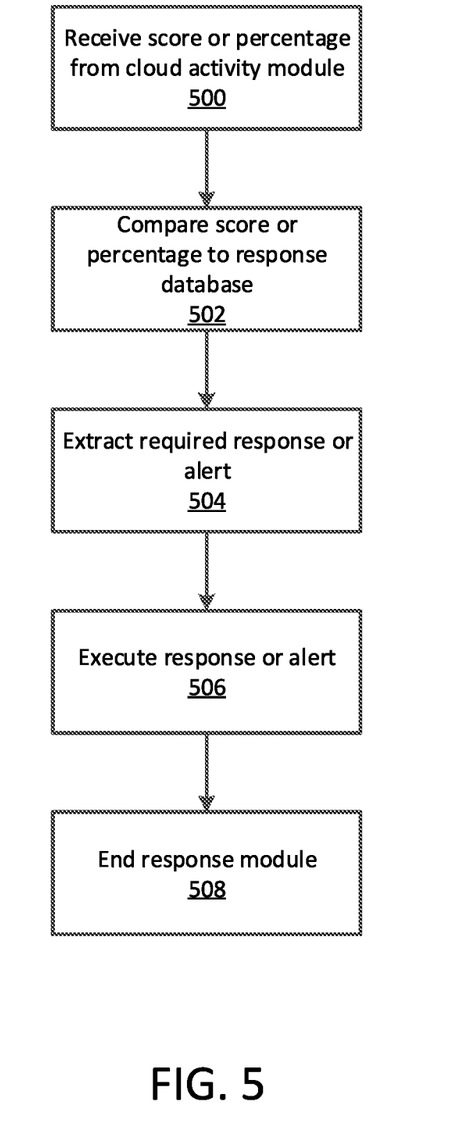
FIG. 5 is a flowchart illustrated an exemplary response module method for Wi-Fi-based motion detection.

FIG. 5 is a flowchart illustrated an exemplary response module method for Wi-Fi-based motion detection.

The process begins at step 500 when the response module 142 first receives the score, percentage, or other information from the cloud activity module 144. The received score, percentage, or other information are then compared at step 502 to the response database 140. Each level of compliance has a specific set of responses (e.g. commands) or actions associated with it. Those actions or response commands are then extracted at step 504 from the response database 140.

The extracted responses and actions are then executed, at step 506. For example, depending on the level of compliance different reports or alerts maybe sent out to different individuals such as caregivers or doctors. The extracted responses and actions may include a range of different actions from sending alerts of different levels urgency to caregivers, automatically initiated an emergency, providing reports on ADL activities, or even sending information or operating IoT devices 114 to assist the user. In another example, if the average compliance score or percentage is below a predetermined threshold, a dentist office may be notified that an appointment needs to be scheduled for the user. Once all responses and actions have been executed the response module 142 then ends at step 508.

Figure 6:
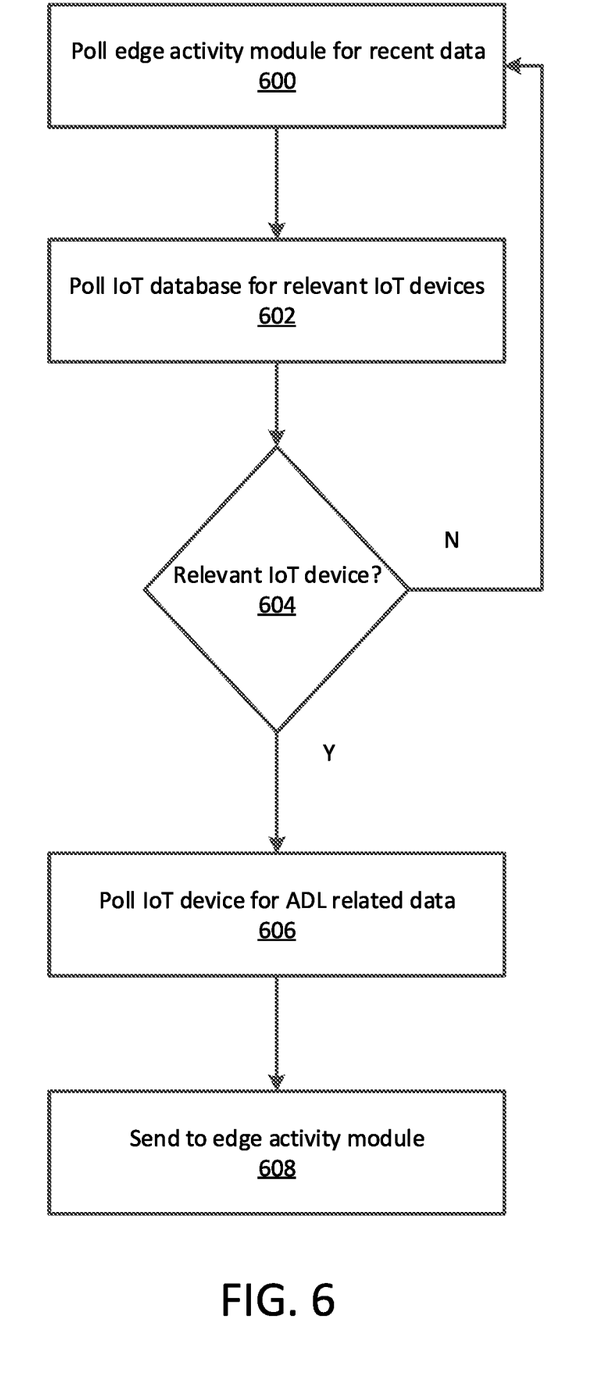
FIG. 6 is a flowchart illustrated an exemplary IoT device module method for Wi-Fi-based motion detection.

FIG. 6 is a flowchart illustrated an exemplary IoT device module method for Wi-Fi-based motion detection.

The process begins at step 600 with the IoT device module 148 polling the edge activity module 124 for data related to the most recent detected ADL activity. The IoT device database 146 is then polled at step 602 to determine if there are any IoT devices 114 relevant to the ADL activity. For example, IoT device database 146 is polled to determine if there are any IoT devices 114 related to bathing activities in general. As a further example, IoT device database 146 is polled to determine IoT devices 114 that may specifically relate to the current bathing activity. For instance, if it is determined that the user is about to enter the shower, a related IoT devices 114 for this step or action may be a smart showerhead.

As another example, if the current ADL activity is the user selecting clothing, a smart dresser may provide data that showed that the person dressing, or undressing opened up a drawer of the dresser confirming the current activity.

IoT devices 114 relevant to the current ADL activity received from the edge activity module 124 are identified at step 604. In an example, if the step or action for the ADL activity is the user getting in to the shower or testing the water, the relevant IoT device 114 maybe a smart showerhead. As another example, a dresser may provide information about when and which drawer a person opened.

If there is no related IoT device for the current activity the process is restarted at step 600 and the IoT device module 148 begins polling the edge activity module 124 again for the next ADL activity. If relevant IoT devices 114 are identified at step 606 they are then polled for the current data, at step 608. The data received from the relevant IoT devices 114 is then sent back to the edge activity module 124 which can be logged and used for compliance, alerting, or taking immediate action, at step 610. For example, a smart showerhead could stop the flow of water a patient enters the shower when the temperature of the water is above a certain temperature to prevent burns.

The foregoing detailed description of the present disclosure has been presented for purposes of illustration and description. It is not intended to be exhaustive or to limit the present disclosure to the precise form disclosed. Many modifications and variations are possible in light of the above teaching. The described embodiments were chosen in order to best explain the principles of the present disclosure, its practical application, and to enable others skilled in the art to utilize the technology in various embodiments and with various modifications as are suited to the particular use contemplated.

What is claimed is:

1. A method for analyzing user movement, the method comprising:
    monitoring data corresponding to a movement by a user at a location, wherein the data is monitored via one or more wireless devices at the location;
    analyzing the monitored data to identify that the monitored data indicates one or more steps specific to an identified activity;
    predicting a next step of the movement based on a comparison of the monitored data to a stored data set regarding the identified activity;
    assigning a compliance level score to the monitored data based on whether the predicted next step has occurred; and
    executing a response identified from a response database based on the compliance level score.

2. The method of claim 1, further comprising determining whether the predicted next step has occurred based on whether a limit has been reached.

3. The method of claim 2, wherein the limit may be a time limit or a counter limit.

4. The method of claim 1, wherein predicting the next step of the movement is further based on a comparison of the monitored data to one or more best practices for the identified activity.

5. The method of claim 1, wherein predicting the next step of the movement is further based on an amount of the identified activity.

6. The method of claim 1, wherein predicting the next step of the movement is further based on a gender of the user.

7. The method of claim 1, further comprising determining whether the predicted next step has occurred based on subsequent monitored data.

8. The method of claim 7, wherein determining whether the predicted next step has occurred is based on whether the subsequent monitored data corresponds to the predicted next step of the identified activity or to one or more other activities.

9. The method of claim 1, further comprising storing data in memory regarding a plurality of different activities in an activity database, wherein the stored data includes at least one pattern of channel state information associated with the identified activity.

10. The method of claim 1, further comprising downloading a data set regarding the predicted next step of the movement; and
    storing the downloaded data set in an activity database in memory; wherein
    the data set includes at least one pattern of channel state information associated with the predicted next step of movement.

11. The method of claim 1, wherein executing the response includes sending an alert to a designated recipient device associated with the user.

12. The method of claim 1, wherein the wireless devices include at least one of an Internet of Things device, a wearable device and a smart device.

13. The method of claim 1, further comprising storing the monitored data in an activity logging database in memory; wherein the monitored data is stored in association with at least one of a date, time, or duration associated with the movement.

14. A system for analyzing user movement, the system comprising:
one or more wireless devices at a location, wherein the wireless devices monitor data corresponding to a movement by a user at the location;
an agent device that analyzes the monitored data to identify that the monitored data indicates one or more steps specific to an identified activity; and
a cloud device that
predicts a next step of the movement based on a comparison of the monitored data to a stored data set regarding the identified activity;
assigns a compliance level score to the monitored data based on whether the predicted next step has occurred; and
executes a response identified from a response database based on the compliance level score.

15. The system of claim 14, wherein
the cloud device determines whether the predicted next step has occurred based on whether a limit has been reached.

16. The system of claim 14, further comprising
an activity best practices database in memory that stores data regarding one or more best practices for the identified activity; wherein
the cloud device predicts the next step of the movement based on comparing the monitored data to the stored data in the activity best practices database.

17. The system of claim 14, wherein
the cloud device executes the response by sending an alert to a designated recipient device associated with the user.

18. The system of claim 14, wherein
the wireless devices include at least one of an Internet of Things device, a wearable device and a smart device.

19. The system of claim 14, further comprising
an activity database in memory that stores data regarding a plurality of different activities; wherein
the stored data includes at least one pattern of channel state information associated with the next step of the movement.

20. A non-transitory, computer-readable storage medium, having embodied thereon a program executable by a processor to perform a method for analyzing user movement, the method comprising:
monitoring data corresponding to a movement by a user at a location, wherein the data is monitored via one or more wireless devices at the location;
analyzing the monitored data to identify that the monitored data indicates one or more steps associated with an identified activity;
predicting a next step of the movement based on a comparison of the monitored data to a stored data set regarding the identified activity;
assigning a compliance level score to the monitored data based on whether the predicted next step has occurred; and
executing a response identified from a response database based on the compliance level score.

* * * * *